United States Patent [19]

Stalzer

[11] 4,427,275

[45] Jan. 24, 1984

[54] XEROGRAPHIC ELECTRONIC PRINTER

[75] Inventor: Henry Stalzer, Danbury, Conn.

[73] Assignee: Pitney Bowes Inc., Stamford, Conn.

[21] Appl. No.: 400,802

[22] Filed: Jul. 22, 1982

[51] Int. Cl.³ .................... B41B 13/00; G03B 41/00
[52] U.S. Cl. ................................ 354/4; 346/107 R;
346/108; 354/5
[58] Field of Search ................. 101/426, DIG. 13;
400/120; 346/107 R, 108, 160; 354/4, 5; 355/3
TR; 358/302

[56] References Cited

U.S. PATENT DOCUMENTS

| | | | |
|---|---|---|---|
| 3,824,604 | 7/1974 | Stein | 101/DIG. 13 |
| 3,832,488 | 8/1974 | Fahey | 354/5 X |
| 3,952,311 | 4/1976 | Lapeyre | 354/4 |
| 3,988,742 | 10/1976 | Meier et al. | 346/107 R |
| 4,021,106 | 5/1977 | Gaynor | 101/DIG. 13 |
| 4,053,898 | 10/1977 | Hirayama et al. | 354/5 |
| 4,090,206 | 5/1978 | Pfeifer et al. | 354/4 |
| 4,096,486 | 6/1978 | Pfeifer et al. | 354/4 |
| 4,107,687 | 8/1978 | Pfeifer et al. | 346/107 R |
| 4,170,745 | 10/1979 | Rich et al. | 354/4 |
| 4,279,483 | 7/1981 | England et al. | 354/4 |

*Primary Examiner*—E. H. Eickholt
*Attorney, Agent, or Firm*—Peter Vrahotes; Melvin J. Scolnick; Albert W. Scribner

[57] ABSTRACT

This invention relates to a system for non-impact printers such as those that use light emitting diodes (LEDs) to produce an image on a photoconductor. In such devices, a discontinuity is generally created in a line of printed characters because of the movement of the imaging surface relative to the LED array. The system of this invention eliminates such discontinuity through adjustment in the enabling sequence of the LEDs of the array.

5 Claims, 6 Drawing Figures

XEROGRAPHIC ELECTRONIC PRINTER

BACKGROUND OF THE INVENTION

Non-impact printers are coming into more frequent use as a result of the advances in the technology relative to such printers. One such type of printer is a xerographic printer in which light emitting diodes (LEDs) are enabled in a selected manner to create an image on a photoconductive surface by producing a plurality of dots which collectively combine to form the characters of a printed text. In such a device, an input is supplied to the electronics of a print head which controls the enabling of the LEDs so that the text being inputted will be reproduced on a charged xerographic surface in the form of an image. This image may be developed and transferred as is well known in the art.

One shortcoming of an LED xerographic type of nonimpact printer is that a discontinuity is created as a result of the movement of the xerographic surface relative to the LED array. An LED array of any substantial size is composed of a plurality of units or modules. Each module is made up of a number of rows of longitudinally extending LED sites and these modules are placed in tandem with one another so that an extended longitudinal row of LED sites is created along the length of the array. Each LED module is operated independently. The manner in which an array is operated involves simultaneously enabling the first LED of each module, then the second LED of each module, then the third, and so forth down the line in sequence. As these LEDs are being enabled in turn, the xerographic surface moves relative thereto so that the line of dots being formed is formed at an angle rather than along a straight line as would be the case if the xerographic surface were stationary. Normally, such an angle is not observable to the human eye until such time as the dot produced by the last LED of a module is compared to the dot produced by the first LED of an adjacent module. For example, the last dot produced by the first module would be adjacent to the dot produced by the first LED of the second module which was printed at a time $t_1$, whereas the last dot of the first module was printed at $t_n$, $t_n$ being the time required to enable all the LEDs of a module. In this period $t_n$, the xerographic surface addressing the array will move a certain distance "d" and this movement will cause separation of the dot produced by the last LED of the first module from the dot produced by the first LED of an adjacent unit. This distortion is visible to the human eye and results in an unsightly format. Obviously, it would be desirable if such distortion could be eliminated.

Efforts have been made to compensate for the distortion caused by the combination of sequential enabling of the LEDs and the movement of the photoconductor. In one such attempt, the modules were placed at angles, i.e. tilted, relative to the longitudinal direction of the array. The problem with tilting the modules was that it presented an alignment problem.

SUMMARY OF THE INVENTION

A system has been conceived wherein the LEDs of the modules forming an array are not enabled in the same longitudinal direction. With this system, the modules of the array are enabled in such a manner so that LEDs of adjacent units will be enabled at the same time with the direction of enabling reversed, thereby providing a continuous line rather than one which is discontinuous. What is formed, basically, is a "W" shaped line. In such a "W" shaped line, disarrangement is not readily visible to the human eye and an acceptable appearance results therefrom.

DETAILED DESCRIPTION OF THE INVENTION

Figure 1:
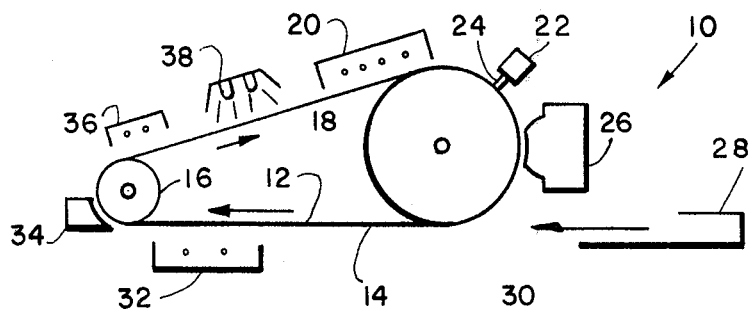
FIG. 1 shows a schematic view of a xerographic printer of the type in which the instant invention may be utilized.

Referring to FIG. 1, a xerographic apparatus or printer is diagramatically shown generally at 10 that is capable of utilizing the instant invention. The apparatus 10 includes an endless belt 12 that has a photoconductive surface 14 on the outer surface thereof. The belt 12 is trained about a roller 16 and a drum 18, either one of which may be driven for the purpose of rotating the photoconductive belt in a closed path. The photoconductive belt 12 would be of a generally known type comprising a substrate such as mylar with a first layer of thin aluminum and a second photoconductive layer 14 disposed on the outer surface thereof. Such photoconductive surface 14 may be zinc oxide, cadmium sulfide or an organic substance having photoconductive properties. As seen in FIG. 1, the photoconductive belt 12 would be rotated in a clockwise direction.

Addressing the photoconductive surface 14 of the belt 12 are a plurality of processing stations including a charge station 20, such as a charge corotron or scorotron, that applies a uniform charge to the photoconductive surface as it passes such station. Downstream from the charge station 20 is an imaging station 22. This imaging station 22 preferably is of the type that selectively directs beams of light upon the photoconductive surface 14 that discharged small areas of the charged photoconductor to create an image representative of the text to be printed or reproduced. Examples of devices that may be used as an imaging station are light emitting diode (LED) arrays and laser systems that are connected to appropriate electronic circuits. A system of the latter type is disclosed in U.S. Pat. No. 4,214,157. The instant invention will be described in terms of an LED unit with the imaging station 22 having an array 24 of LED sites addressing the photoconductive surface 14. Downstream from the imaging station 22 is a development station 26 that is preferably a magnetic brush unit. This magnetic brush unit 26 will be biased with a voltage of the same polarity as the charging station 20 but of a lower level and is operative to deposit toner particles on that portion of the photoconductor that has been discharged by the light from the imaging station 22. A feed station 28 is located downstream from the development station 26 that conveys a sheet of paper 30 to the photoconductive surface 14. A transfer station 32 is located downstream therefrom so that a sheet 30 will pass between the photoconductive surface 14 with the developed image thereon and the transfer station. The transfer station 32 is charged with a polarity opposite to that of the toner particles deposited by the development station so as to cause the toner particle to be attracted thereto and be deposited on the sheet 30 to form the image thereon. Downstream from the transfer station 26 is a separating station 34 wherein the sheet 30 with the transferred image thereon is separated from the belt 12. No separating station may be required where the sheet 30 has sufficient stiffness so that it will not follow the belt 12 as it turns on the roller 16. Downstream from the transfer station 34 is a cleaning corotron 36 and a cleaning lamp 38. The sheet 30 with the image thereon will be conveyed to a fusing station (not shown) to fuse the toner particles thereon and complete the print cycle. Downstream from the cleaning lamp 30 is the charge station 20 wherein the cycle is repeated.

Figure 2:
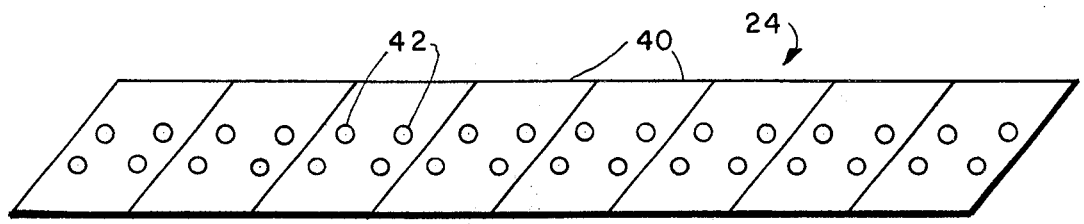
FIG. 2 is a plane view of an array of LEDs.
Figure 3A:
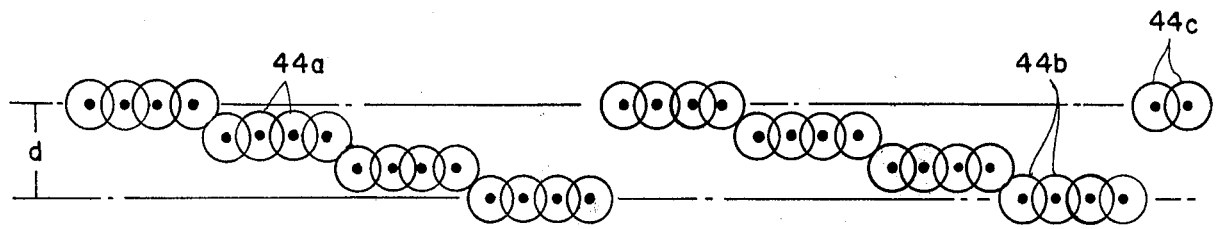
FIG. 3a is a representation of images created during one pass along an LED array as practiced in the prior art.
Figure 3B:
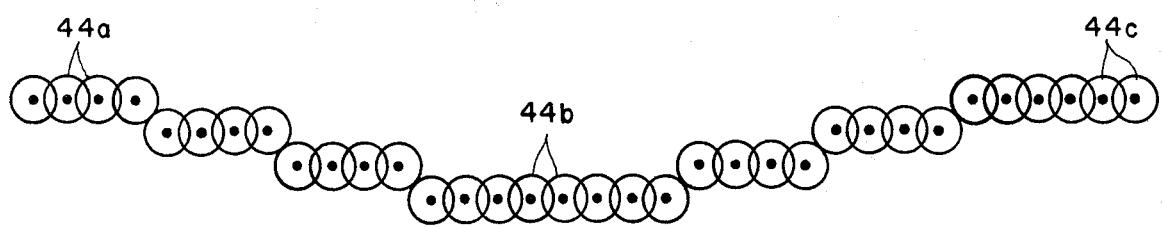
FIG. 3b is a representation of the images created during one pass along an LED array as practiced in the instant invention.

Referring to FIG. 2, the face of the LED array 24 which addresses the belt 12 is shown. The array 24 is made up of a plurality of modules 40 that are joined at their ends in tandem to form a longitudinally extending structure. Each module 40 contains a plurality of light emitting diodes (LEDs) 42. Although the array 24 is shown with each module 40 having four LEDs 42, it will be appreciated this is only for purposes of description of the instant invention and the number of LEDs per module will be substantially greater. For example, in the printer 10 a preferred array 24 that would be used for the printing on a sheet eight inches wide could include sixty-four modules 40, each module having thirty-two LEDs 42 for a total of 2048 LEDs. As illustrated in FIGS. 3a and 3b, these LEDs 42 would create a plurality of dots 44 on a charged photoconductor as the LEDs are enabled. Each dot represents a small discharge area in a charged field, or charged background. Assuming the belt 12 is moving in a downwardly direction relative to the array 24 as seen in FIG. 2, the upper LEDs 42 will be enabled and then the lower ones in coordination with the movement of the belt so that four parallel dots result from the LEDs of a module 40. A single line is shown in FIGS. 3a and 3b with all LEDs enabled, but it will be appreciated that a plurality of lines are required to produce a character and that the LEDs will be selectively enabled so that all the dots will not necessarily be produced.

Figure 4:
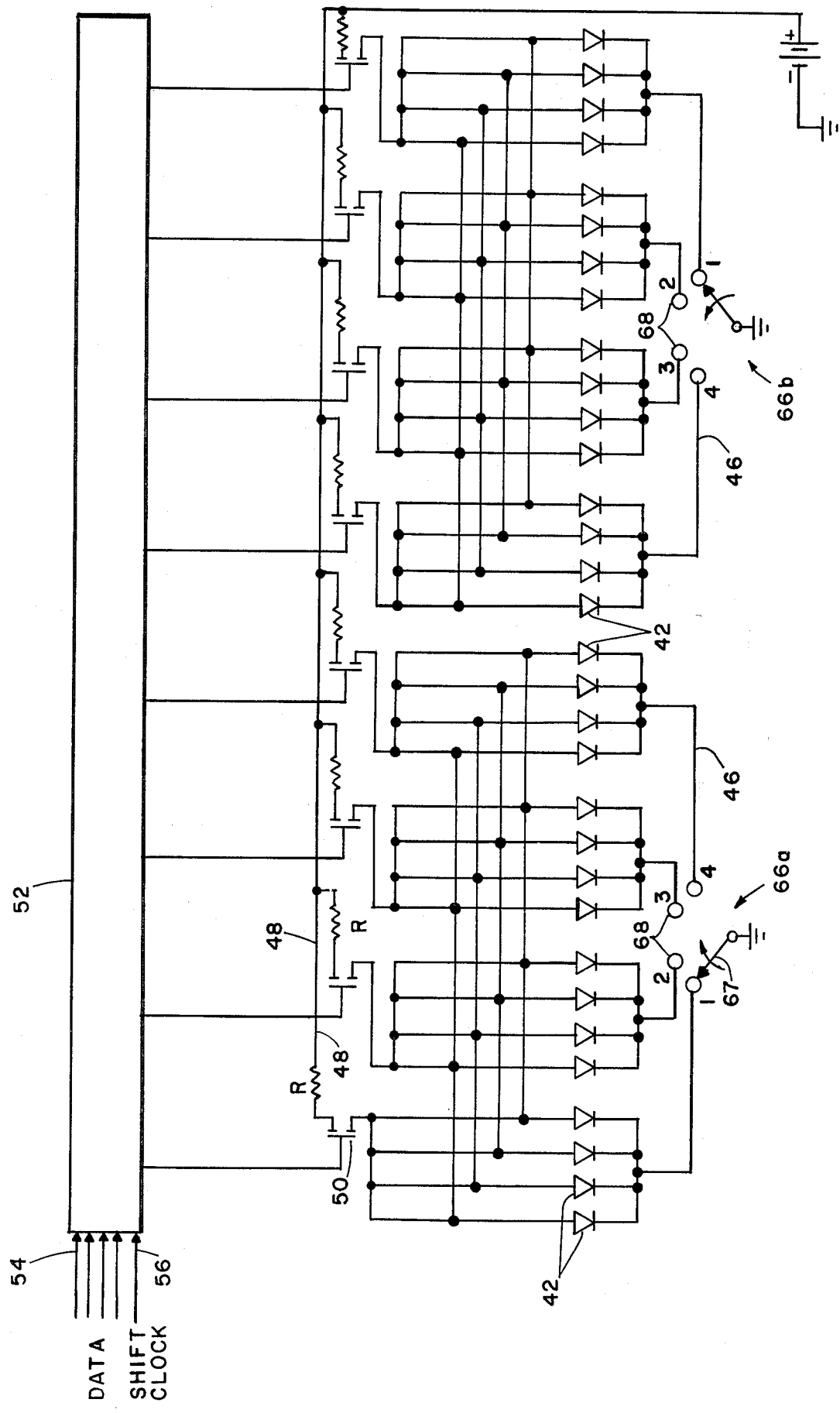
FIG. 4 is a schematic of the circuitry that is utilized in the instant invention.

Referring now to FIG. 4, the LEDs 42 are shown connected in parallel to diode leads 46 and cathode leads 48 and to resistors R through drivers 50 located at the junction between a bank of LEDs 42 and a resistor R. Each driver 50 is connected to an integrated circuit 52. Data input leads 54 and a clock lead 56 are connected to the integrated circuit 52. Data is supplied serially to the integrated circuit 52 with each clock pulse until the registers of the circuit 52 are filled. With the next clock pulse, the data in the integrated circuit 52 will be supplied to the drivers 50. An example of an integrated circuit 52 that may be used in the instant invention is a Motorola eight bit shift register MC 140948 available from Motorola Semiconductor Products Inc., Austin, Tex.

A plurality of switches 66 connect the LEDs 42 to the cathodes 46 by means of grounded pivoted arms 67. These arms 67 are pivotable so as to sequentially contact terminals 68 which are connected to the LEDs 42 of a module 40, each terminal being connected to the LEDs of one module and each switch including four terminals as shown. It will be appreciated that each switch only includes four terminals but in actual practice the number of terminals will be substantially greater, the preferred number of terminals being sixteen. The arms 67 are caused to swing in a clockwise direction so as to contact the terminals 1-4 in sequence to create dots 44 on the photoconductor 14 as shown in FIG. 3a. As shown, the LEDs 42 will create a group of four dots 44 and then the arm will swing to terminal "2" and the next four dots will be printed. Because the belt 12 is moving relative to the array 24, when this second group of four dots 44 are created they will not be aligned with the first group and a series of steps will be created as a result of the four groups of dots being printed in sequence as has been practiced heretofore. As seen in FIG. 3a, when the last group of dots is created by action of a switch 66a, a space "d" exists between this last group of dots 44a to be printed by the switch and the first dot printed by the next switch 40b. The same is true of the last group of dots 44b created by the action of the switch 66b and the first group of dots 44c created by a switch 66c (not shown). This step is visually noticeable and results in inferior print quality.

In order to overcome the prior problem and to improve the quality of printing, it has been found that altering the sequence of enabling the modules 40 results in a form of printing where deviations are not apparent visually. As seen in FIG. 4 and illustrated in FIG. 3b, the arms 66 of adjacent switches are rotated in opposite directions so that adjacent LEDs 42 will start at the same level and the dots 44 created thereby wil take the form as shown in FIG. 3b. As demonstrated by FIG. 3b, there is no step or discontinuity in the row of dots 44 created by the array 24. Instead, the dots 44 form a general wave pattern which is not apparent visually. As a result superior printing is achieved.

Figure 5:
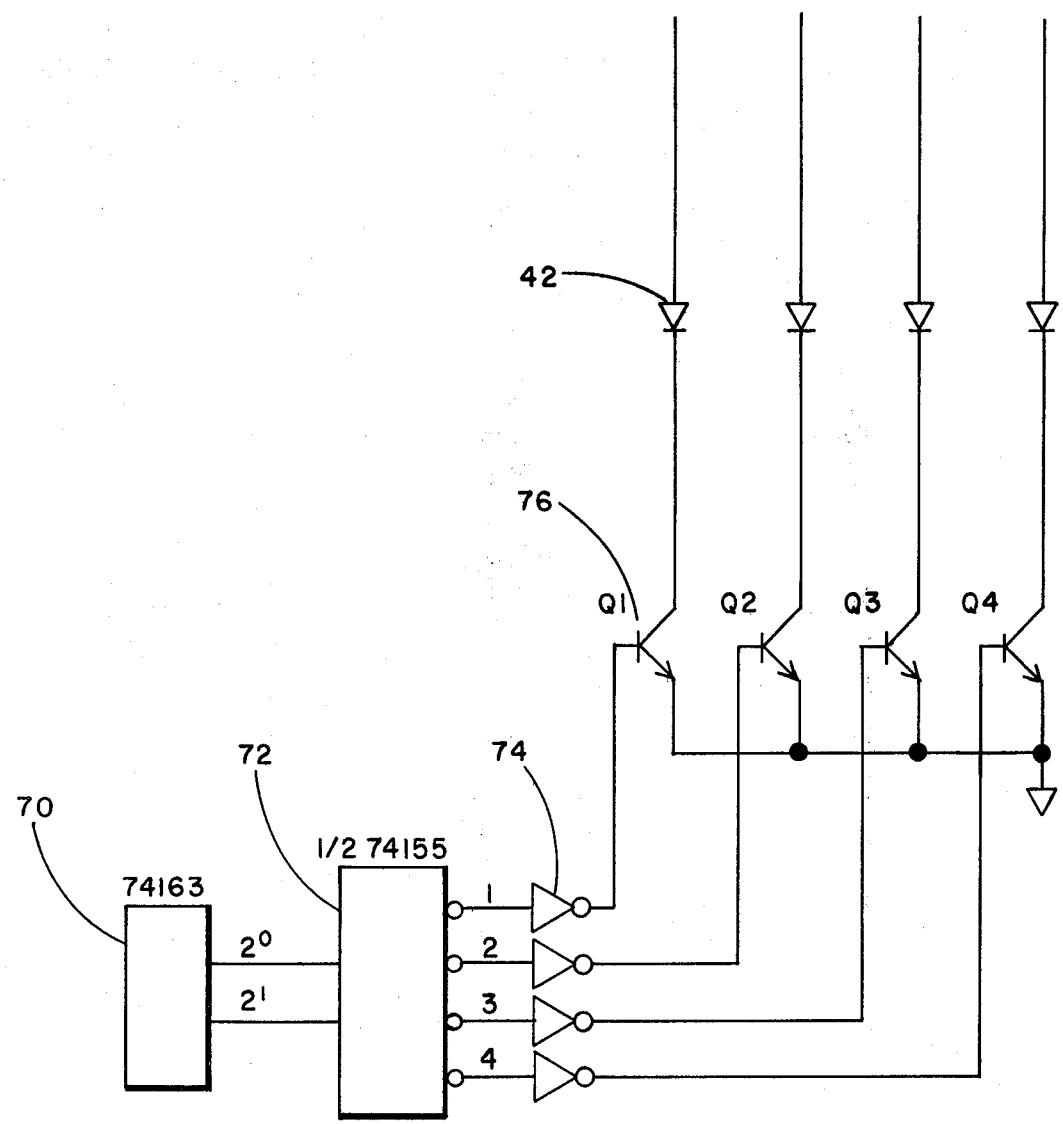
FIG. 5 is a schematic representation of the circuitry for producing the enabling cycle.

FIG. 4 shows mechanical switches 66 for contacting the terminals 68. This was for the purpose of illustration only. Solid state devices such as shown in FIG. 6 would actually be used to achieve the sequence of operation heretofore described. In FIG. 5 one such solid state device is shown which includes a binary counter 70 that is connected to a decoder 72 which, in turn is connected to the LEDs 42 through invertors 74 and collectors 76. One of these solid state devices would occupy the position of each of the mechanical switches shown in FIG. 4.

What is claimed is:

1. An apparatus for producing a continuous line of dots formed on a charged photoconductive surface by the enabling of light emitting diodes, the system comprising: an imaging station made up of a plurality of longitudinally extending modules, each of said modules having a plurality of light emitting diodes arranged in at least one longitudinal row, means for moving a photoconductive surface past said modules, and means for selectively enabling the light emitting diodes of said rows so that the light emitting diodes of adjacent modules are enabled sequentially in opposite longitudinal directions.

2. An apparatus for producing a continuous line of dots formed on a charged photoconductive surface by the enabling of light emitting diodes, the system comprising: a photoconductive surface, means for charging the photoconductive surface, an imaging station made up of a plurality of modules, each of said modules having a plurality of light emitting diodes arranged in at least one longitudinal row, means for conveying said photoconductive surface past said modules, means for sequentially enabling the light emitting diodes of said rows so that the light emitting diodes of adjacent modules are enabled in opposite longitudinal directions, means for developing the image on the photoconductor, means for contacting the developed image with a sheet of paper, means for transferring the developed image from the photoconductor to the sheet of paper and means for separating the sheet from the photoconductor.

3. A method of producing a continuous line of dots formed on a charged photoconductive surface by the enabling of light emitting diodes, the steps comprising: providing an imaging station made up of a plurality of longitudinally extending modules, each of said modules having at least one longitudinally extending row of light emitting diodes, conveying a photoconductive surface past the imaging station, and enabling individual ones of said light emitting diodes in each module by sequentially enabling the light emitting diodes so that the light emitting diodes of adjacent modules are enabled sequentially in opposite longitudinal directions.

4. A method of producing a continuous line of dots on a charged photoconductive surface by the enabling of light emitting diodes, comprising: providing a photoconductive surface, electrostatically charging the photoconductive surface, providing an imaging station made up of a plurality of longitudinally extending modules, each of said modules having at least one longitudinally extending row of light emitting diodes, addressing the imaging station to the charged photoconductive surface, moving the charged photoconductive surface past the imaging station, sequentially enabling the light emitting diodes so that the light emitting diodes of adjacent modules are enabled sequentially in opposite longitudinal directions.

5. The method of claim 4 including the further steps of developing the image on the photoconductor, contacting the developed image with a sheet of paper, transferring the developed image from the photoconductor to the sheet of paper, and separating the sheet from the photoconductor.

* * * * *